US006087955A

United States Patent [19]
Gray

[11] Patent Number: 6,087,955
[45] Date of Patent: Jul. 11, 2000

[54] APPARATUS AND METHOD FOR PROVIDING AN AUTHENTICATION SYSTEM

[75] Inventor: Robert J. Gray, Costa Mesa, Calif.

[73] Assignee: Litronic, Inc., Irvine, Calif.

[21] Appl. No.: 09/123,964

[22] Filed: Jul. 29, 1998

Related U.S. Application Data

[63] Continuation of application No. 08/744,363, Nov. 7, 1996, Pat. No. 5,844,497.

[51] Int. Cl.[7] .............................. H04K 1/00; H04L 9/00
[52] U.S. Cl. ............................. 340/825.34; 340/825.31; 380/3; 380/4; 380/21; 380/23; 380/25; 235/379; 235/380; 235/382
[58] Field of Search ..................... 340/820.31, 825.34; 380/3, 4, 23–25; 235/382, 380, 379; 364/927.83, 928, 988.5; 395/187.01

[56] References Cited

U.S. PATENT DOCUMENTS

| | | | |
|---|---|---|---|
| 3,609,690 | 9/1971 | Nissman et al. | 340/149 R |
| 3,764,742 | 10/1973 | Abbott et al. | 178/22 |
| 4,295,039 | 10/1981 | Stuckert | 235/380 |
| 4,376,279 | 3/1983 | Perlman et al. | 235/380 |
| 4,501,957 | 2/1985 | Perlman et al. | 235/379 |
| 4,598,170 | 7/1986 | Poisenka et al. | 178/22.08 |
| 4,688,020 | 8/1987 | Keuhneman et al. | 340/825.34 |
| 4,783,798 | 11/1988 | Leibholz et al. | 380/23 |
| 4,797,928 | 1/1989 | Dykes | 380/21 |
| 4,881,263 | 11/1989 | Herbison et al. | 380/21 |
| 4,914,696 | 4/1990 | Dudczak et al. | 380/21 |
| 4,924,513 | 5/1990 | Herbison et al. | 380/21 |
| 4,942,606 | 7/1990 | Kaiser et al. | 380/4 |
| 4,951,249 | 8/1990 | McClung et al. | 364/900 |
| 4,965,804 | 10/1990 | Trbovich et al. | 380/21 |
| 4,980,913 | 12/1990 | Skret | 380/23 |
| 4,984,272 | 1/1991 | McIlroy et al. | 380/25 |
| 4,995,112 | 2/1991 | Aoyama | 380/25 |
| 5,001,755 | 3/1991 | Skret | 380/46 |
| 5,018,096 | 5/1991 | Aoyama | 364/900 |
| 5,048,087 | 9/1991 | Trbovich et al. | 380/43 |
| 5,063,596 | 11/1991 | Dyke | 380/49 |
| 5,065,429 | 11/1991 | Lang | 380/25 |
| 5,093,861 | 3/1992 | Graham | 380/23 |
| 5,097,506 | 3/1992 | Kaiser, Jr. et al. | 380/25 |
| 5,204,512 | 4/1993 | Ieki et al. | 235/382 |
| 5,212,729 | 5/1993 | Schafer | 380/4 |
| 5,224,166 | 6/1993 | Hartman, Jr. | 380/50 |
| 5,233,655 | 8/1993 | Shapiro | 380/23 |
| 5,297,200 | 3/1994 | Murray | 380/4 |
| 5,313,637 | 5/1994 | Rose | 395/725 |
| 5,327,497 | 7/1994 | Mooney et al. | 380/25 |
| 5,406,624 | 4/1995 | Tulpan | 280/4 |
| 5,442,342 | 8/1995 | Kung | 340/825.34 |
| 5,515,440 | 5/1996 | Mooney et al. | 380/25 |

*Primary Examiner*—William A. Cuchlinski, Jr.
*Assistant Examiner*—Yonel Beaulieu
*Attorney, Agent, or Firm*—Blakely, Sokoloff, Taylor & Zafman

[57] ABSTRACT

A method and apparatus for controlling access to at least one program on a computer by verifying data entered through a keyboard with data stored on a token such as a card, while isolating the entered data from the computer. The apparatus includes a verification device, external to the computer, which receives the card. When activated, the verification device isolates itself from the computer, and then receives the entered data and forwards the entered data to the card. The card compares the entered data with data stored on the card. The result of the comparison is forwarded to the verification unit which generates a status signal indicative of the result of the comparison. The verification device is operable in a first mode wherein data provided to the verification unit via the keyboard is not provided to the computer. The verification device is also operable in a second mode, wherein at least one program on the computer is accessible via the keyboard when the data entered through the keyboard matches the data from the card. When operating in a third mode, communications is restricted to that between the verification device and the computer. The verification device operates in one of the three modes in accordance with commands from the computer.

21 Claims, 11 Drawing Sheets

FIG. I

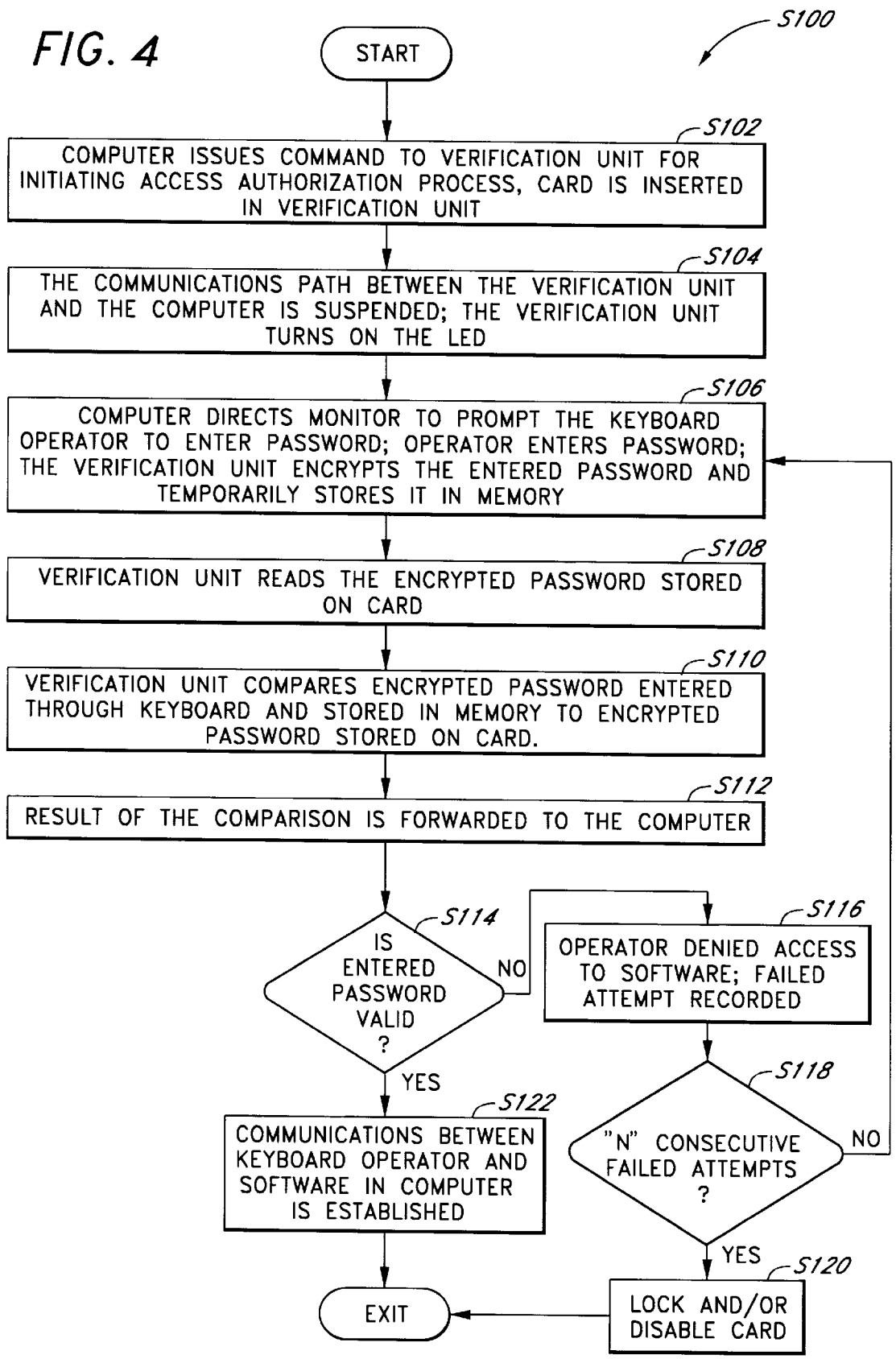

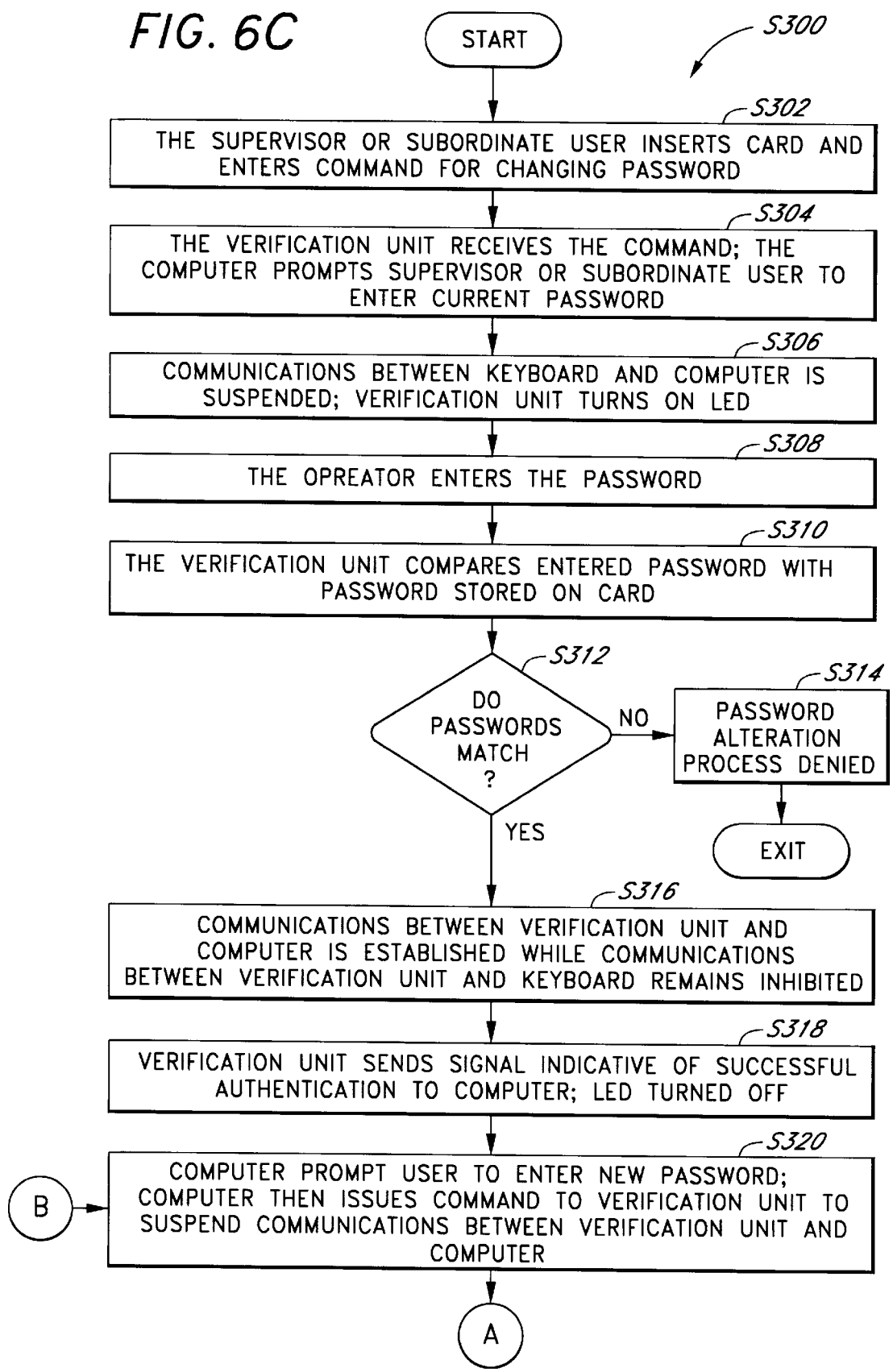

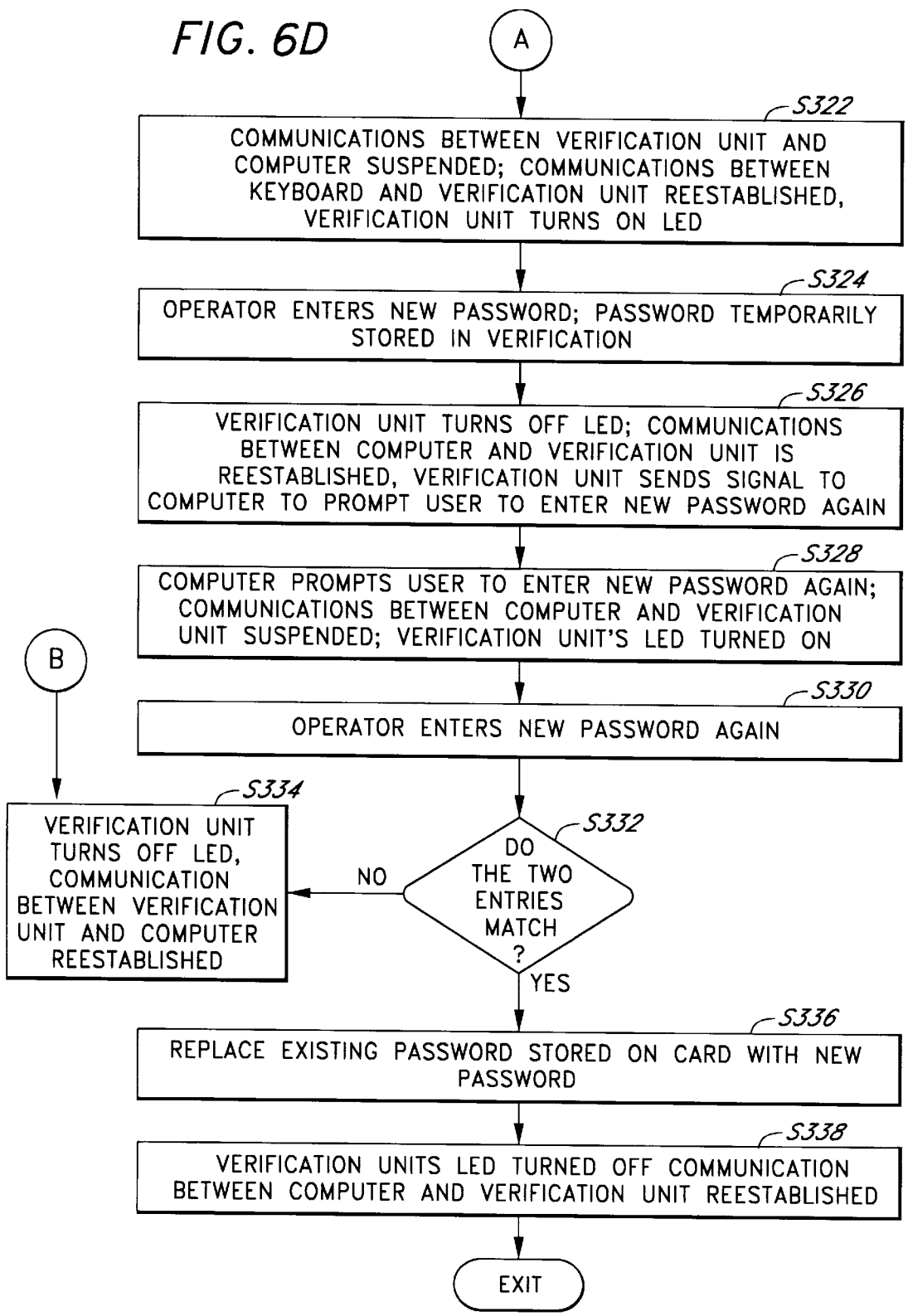

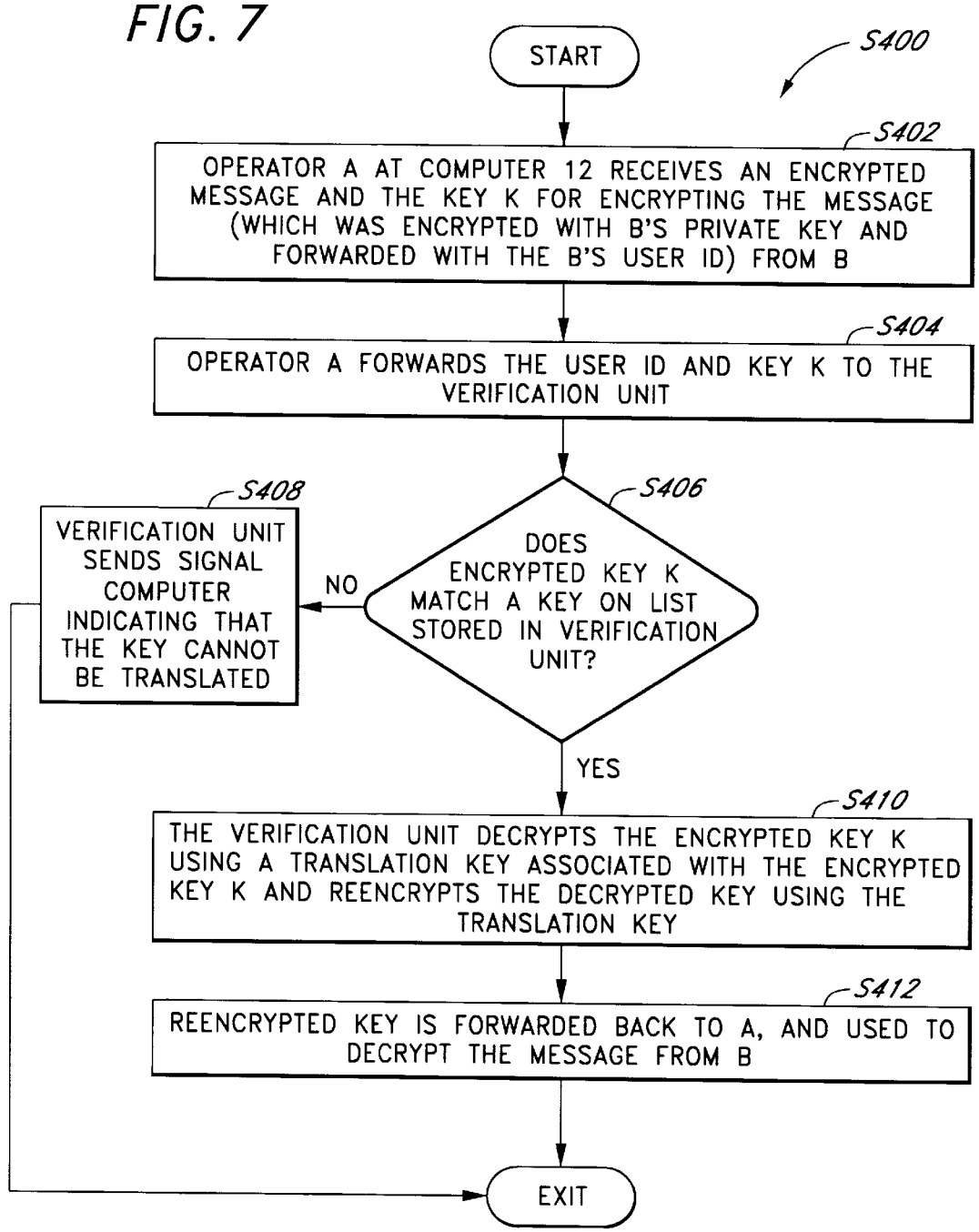

APPARATUS AND METHOD FOR PROVIDING AN AUTHENTICATION SYSTEM

RELATED APPLICATION

This application is a continuation of U.S. application Ser. No. 08/744,363, filed Nov. 7, 1996, now U.S. Pat. No. 5,844,497.

BACKGROUND OF THE INVENTION

1. Field of the Invention

The present invention relates to information security devices, and more particularly to a method and apparatus of providing a secure authentication system utilizing a protected personal identification number (PIN) path.

2. Description of the Related Art

With the widespread use of computers, there is an increased need for controlling access to the computers and to the sensitive information stored within the computers. To provide additional security, cryptographic tokens, such as credit-card sized devices with built-in microprocessors and non-volatile memory are utilized in controlling access to computer systems. They are typically issued to a user with personalized information and private keying material and a personal access code, commonly known as a Personal Identification Number ("PIN"). The user must present a correct PIN to the card or to a device which reads the card, so as to unlock the card for operation. To compromise a card, a malicious user must be in physical possession of the card and also know the private PIN code. Since the PIN is typically entered directly into the computer, the security of such systems may still be compromised since the PIN may be captured by software specifically designed for the purpose.

One current approach to this problem is the use of an electro-mechanical device, or card reader, into which the user inserts the token. The device is, in turn, coupled to a computer. The user must enter his PIN directly into the card reader through a keypad mounted on the card reader. The card reader then verifies the PIN with the cryptographic key on the token. If the PIN is valid, a signal is sent to the computer, which authorizes access to the card's cryptographic information.

This approach however, present several disadvantages. First, the reader must provide the keypad, the keypad interface to the card reader's processor and the software for interpreting the user's entry. This feature adds to the complexity of the device and its cost. Secondly, a separate keyboard has to be used for accepting user input or commands to the computer. As a result, the user has to relocate from the keyboard to the keypad or vice versa. If repeated attempts at entering the PIN are required, such movement may prove distracting. The use of such a device is thus both awkward and expensive.

A second approach, as described in U.S. Pat. No. 5,406,624 (the "'624 patent"), involves the use of a security unit that is connected between a computer and keyboard. The security unit includes a processor which stores a number of security programs for operating the security unit, controlling attached peripherals and executing cryptographic algorithms. The security unit operates in one of two fundamental modes: a Transparent Mode in which data inputted from the keyboard to the security unit is transmitted to the computer, and a Special Handling Mode in which data entered from the keyboard is isolated from the computer so that the security unit assumes complete control of data provided via the keyboard. The Special Handling Mode in effect causes the security unit to replace the computer, executing security-related algorithms and in general, duplicating the operations of the computer in controlling the input, processing and displaying of information. The control means for selecting one of these modes involves downloading cryptographically signed software from the host computer and executing it within the security unit, or the use of a switchbox connected between the security unit and the computer, which enables manual selection of the modes. In the '624 patent, security key operations are performed in the security unit. These security key operations include the verification of a program's signature, ciphering and deciphering of passwords and other like operations.

This second approach also presents several disadvantages. First, since the security and peripheral control programs executed by the security unit are of significant computational complexity, it requires a powerful processor and large amounts of memory to be effective. This processing requirement, and the control electronics for a variety of peripheral devices adds significant cost to the unit, placing it out of reach for a large number of potential users. Secondly, if the control means is implemented using downloadable software, an additional security risk is incurred since this software comes from an external source, which could be intercepted and compromised. The '624 device attempts to guard against this risk by requiring such software to be accompanied by a signature. However, this in turn limits the usefulness of the device for those applications which do not have the proper signature, and which do not have the knowledge (or code) required to interface with the security unit's processing system. If the control means is implemented using a manual switch, the operator has to be constantly interrupted to attend to the selection of the two modes, and may often find himself committing errors which hinder the effectiveness and the security of the unit.

Accordingly, there is a need in the technology for a simple, elegant and cost-effective consumer-level method and apparatus of authenticating a password or personal identification number (PIN) independently from the computer, so that access control to one or more application programs running on the computer may be enforced, while minimizing the risk of capture of the password by unauthorized users and also minimizing the complexity of user operation.

BRIEF SUMMARY OF THE INVENTION

A method and apparatus for controlling access to at least one program on a computer by verifying data entered through a keyboard with data stored on a token such as a card, while isolating the entered data from the computer. The apparatus includes a verification device, external to the computer, which receives the card. When activated, the verification device isolates itself from the computer, and then receives the entered data and forwards the entered data to the card. The card compares the entered data with data stored on the card. The result of the comparison is forwarded to the verification unit which generates a status signal indicative of the result of the comparison. The verification device is operable in a first mode wherein data provided to the verification unit via the keyboard is not provided to the computer. The verification device is also operable in a second mode, wherein at least one program on the computer is accessible via the keyboard when the data entered through the keyboard matches the data from the card. When operating in a third mode, communications is restricted to that between the verification device and the computer. The verification device operates in one of the three modes in accordance with commands from the computer.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 is a flow chart of the access authorization process S100 of the present invention.

FIGS. 6C and 6D illustrate a flow chart of the password alteration process S300 of the present invention.

FIG. 7 is a flow chart of the key translation process S400 of the present invention.

DETAILED DESCRIPTION OF THE INVENTION

Figure 1:
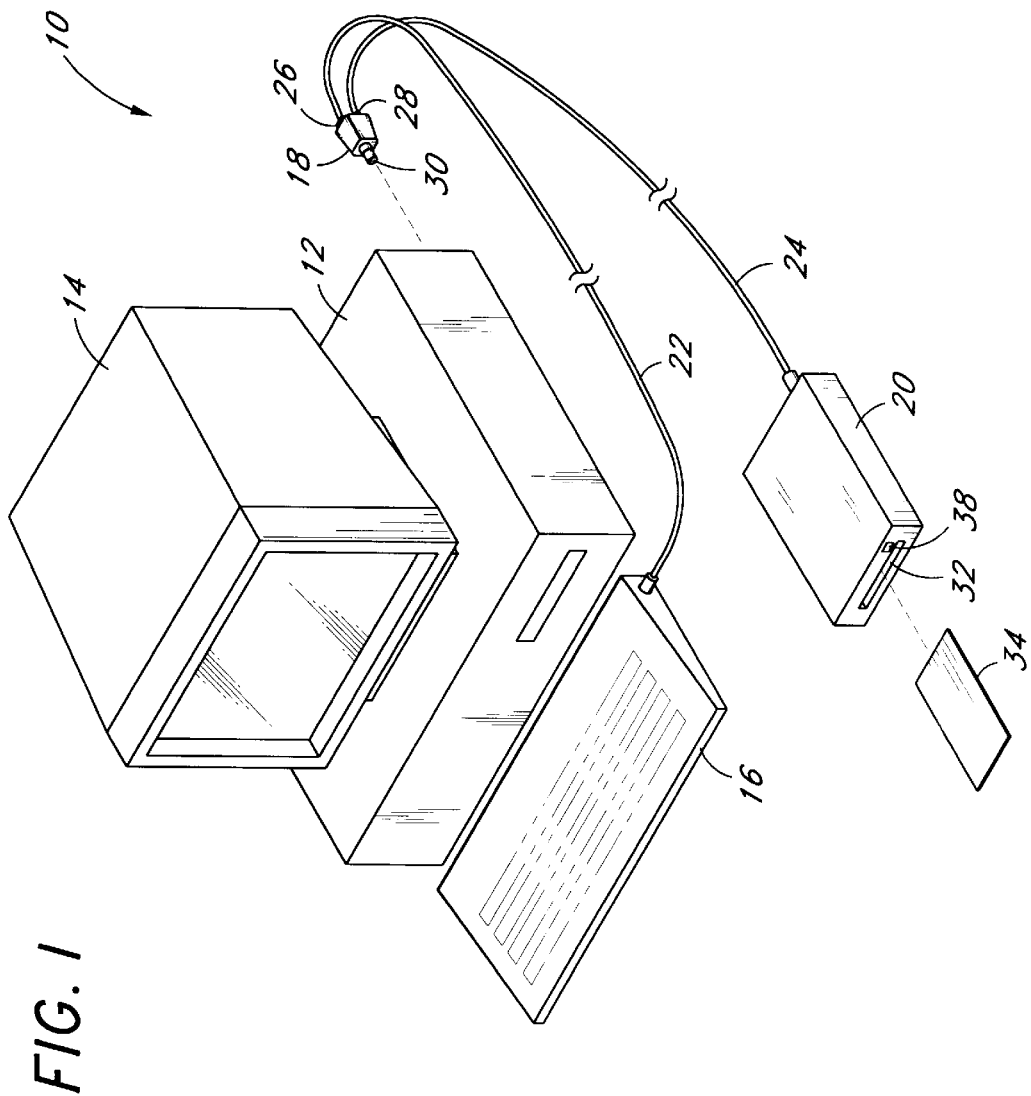
FIG. 1 is a perspective view of the authenticating system of the present invention.

FIG. 1 is a perspective view of the authenticating system 10 of the present invention. The authenticating system 10 comprises a computer 12, a monitor 14, a keyboard 16, a connector or an adapter 18 and a verification unit 20. The computer 12 may be a general purpose computer, a personal computer or a workstation. The computer 12 may also be connected to a network (not shown). The keyboard 16 is coupled to a first port 26 of the adapter 18 via a first cable 22. The verification unit 20 is coupled to a second port 28 of the adapter 18 via a second cable 24. The adapter 18 is in turn coupled to the computer 12 via a third port 30. The computer 12 supplies current and voltage to the keyboard 16 and the verification unit 20. However, the keyboard 16 only communicates with the computer 12 through the verification unit 20. The verification unit 20 has a slot 32 which receives a card 34, such as a smartcard, a PCMCIA card or some other personal security token. The verification unit 20 also has a light emitting diode (LED) 38 which is turned on to indicate that the verification unit 20 is ready to accept information from the keyboard 16 and that any information thus communicated will not be provided to the computer 12.

The authenticating system 10 functions under the control of one or more process access control software programs (PACS) residing in the computer 12 to enable the verification unit 20 to intercept and positively verify data such as a security identification number, a password, or a Personal Identification Number (PIN) of the operator requesting control of the application software. For discussion purposes, such data will be referred to as a password. This password is entered via the keyboard 16 and provided via the verification unit 20 to the card 34, which compares the entered password to a password previously stored on the card 34. Upon comparison of the passwords, the card 34 issues a "pass" or a "fail" signal via the verification unit 20 to the computer 12, which either grants or denies execution control of application software to the operator.

Once execution control of the application software has been granted to the user, the user may gain access to the software and/or alter the software accessed. In one embodiment, such application software includes one or more applications software programs residing in the computer 12. Examples of such applications software programs include: E-mail, Database Management Systems (DBMS), Web Browsers and Servers, Electronic Document Interchange/Electronic Fund Transfer (EDI/EFT) and local security programs. In one embodiment, different passwords may be used for obtaining access to different software programs in the computer 12. In another embodiment, a single password may be used for obtaining access to a plurality of software programs. In a further embodiment, a single password may be used to issue or generate additional unique passwords for obtaining access to a plurality of network applications.

Figure 2:
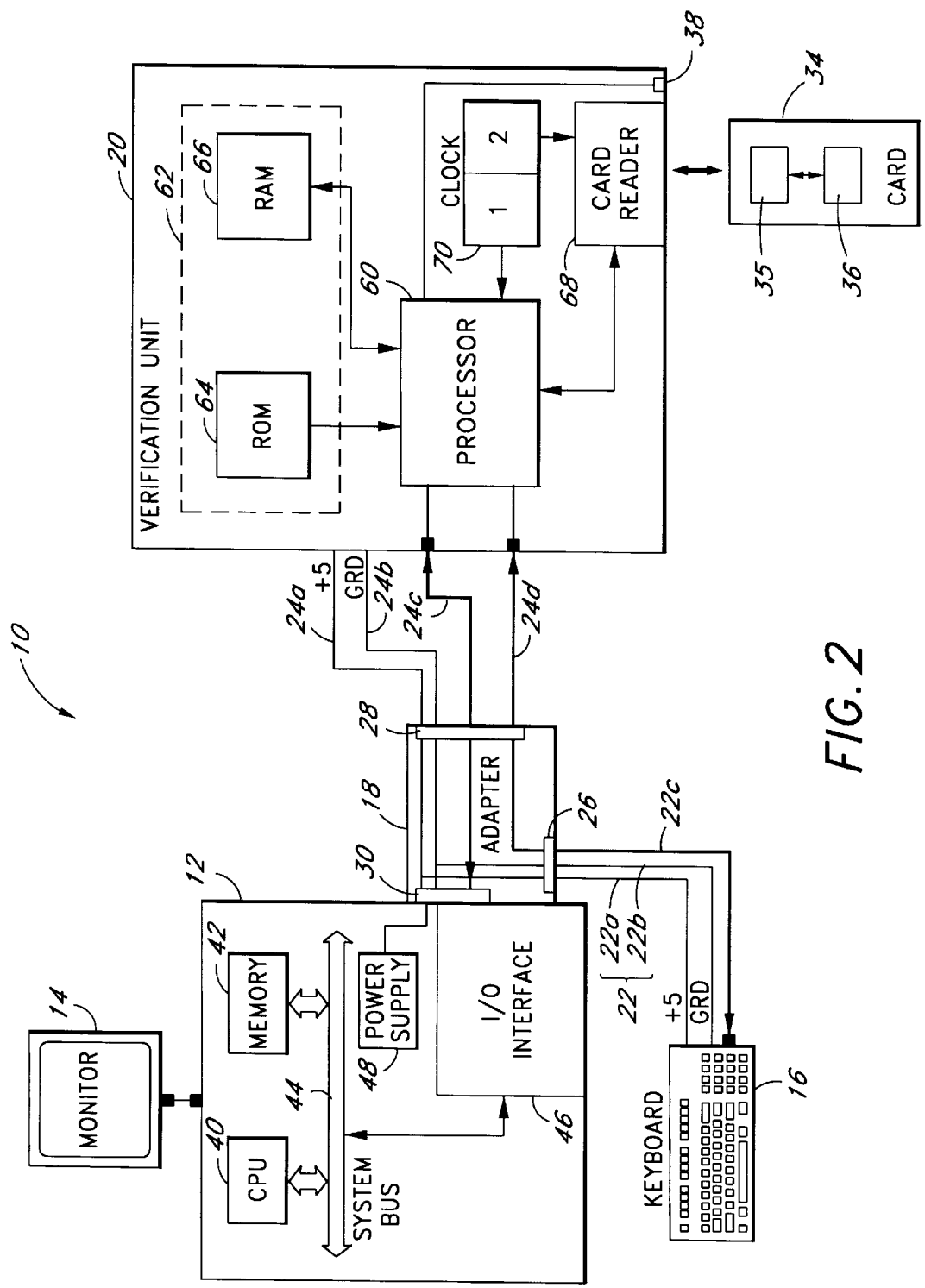
FIG. 2 is a block diagram of the authenticating system of FIG. 1.

FIG. 2 is a block diagram of the authenticating system 10 of FIG. 1. As shown, the computer 12 comprises a processor such as a CPU 40 and a memory module 42. The CPU 40 and memory module 42 are coupled to a system bus 44. The computer 12 also includes an input/output (I/O) interface 46 which is coupled the system bus 44. A power supply 48 supplies current and voltage to the computer 12. Alternatively, the computer 12 may obtain its current and voltage supply externally, for example, from a wall unit.

The present invention is also described in reference to an operating system installed on the computer 12. The operating system supports process access control software (PACS) which enables application programs running on the CPU 40 to perform processes such as data base management, net browsing, electronic mail (e-mail), firewalls, etc. The PACS also enables application programs running on the CPU 40 to control dispatch of commands to the verification unit 20.

As discussed earlier, the keyboard 16 and the verification unit 20 are coupled to the computer 12 through adapter 18. The keyboard 16 is coupled to a first port 26 of the adapter 18 via a first cable 22. The cable 22 comprises three lines, power line 22a, power line 22b and data line 22c. Power line 22a is coupled via adapter 18 to a power supply located in the computer 12, while power line 22b is coupled to ground. The third line 22c is a data line that is coupled through the adapter 18 to the verification unit 20, as discussed below.

The cable 24 comprises four lines, power lines 24a and 24b, and data lines 24c and 24d. Power line 24a is coupled to a power supply 48 (located in computer 12) via adapter 18, while power line 24b is coupled to ground. Data line 24c is coupled via adapter 18 to I/O interface 46 located in computer 12. Data line 24d is coupled to data line 22c (in cable 22) to keyboard 16. Thus, the computer 12 supplies current and voltage to the keyboard 16 and the verification unit 20. However, the keyboard 16 only communicates with the computer 12 through the verification unit 20, as described in detail in the following sections.

With reference to FIG. 2, the verification unit 20 comprises a processor 60 and a memory module 62 which includes both read only memory (ROM) 64 and random access memory (RAM) 66. The verification unit 20 further comprises a card reader/writer 68 which receives the card 34 through a slot 32 (see FIG. 1). A clock module 70 provides timing signals for the operation of the processor 60 and the card 34. In one embodiment, the clock module 70 comprises a single clock which provides timing signals for both the processor 60 and the operation of the card reader/writer 68. In another embodiment, the clock module 70 comprises two clocks, one for driving the processor 60 and the other for driving the operation of the card 34. The card 34 reads and/or writes data to or from the card 34. It also provides timing signals, ground and power to the card 34.

ROM 64 includes firmware which the processor 60 executes for monitoring the line 24c from the computer 12, lines 24d and 22c from the keyboard. This firmware performs read/write operations to/from the card 34 and the read/write operations to/from RAM 66, where RAM 66 is used as a temporary buffer for data inputs and outputs. The verification unit 20 further comprises a light emitting diode (LED) 38, which operates under control of the processor 60 to indicate that the access authorization procedure has been initiated, and that the communication path between the verification unit 20 (and thus the keyboard 16) and the computer 12 has been temporarily suspended. The LED 38 provides visual indication to the keyboard operator that they may securely enter their password via the keyboard 16. This prevents the password from being inadvertently provided to the computer 12.

Data entered via the keyboard 16 is transmitted to the verification unit 20 as scan codes, as is known in the technology. The verification unit 20 interprets the entered scan codes to identify the key the operator has pressed. As the scan codes are resolved, the characters are written to RAM 66. Once the user terminates the entry process, typically through depressing the ENTER key, software running on the processor 60 of the verification unit will encrypt the characters (password) written to RAM 66, read the encrypted password from the card 34 and compare the encrypted passwords. If the encrypted passwords match, the verification unit 20 has "authenticated" the user. It then returns a code indicating success or failure to the computer 12. Alternatively, the authentication process is performed by the card 34. In this case, upon receipt of the password, the verification unit 20 constructs the command code specified by the card 34 manufacturer for a "COMPARE PIN" command, append the password, and write this data to the card 34. The card 34 will then compare the password with the one stored in its non-volatile memory. If the passwords match, the card 34 has "authenticated" the user. It then returns a code indicating success or failure to the verification unit 20. In both cases, the number of consecutive failed attempts is recorded and the card 34 is disabled if a predetermined number (for example, 3 to 7) is reached.

Figure 3A:
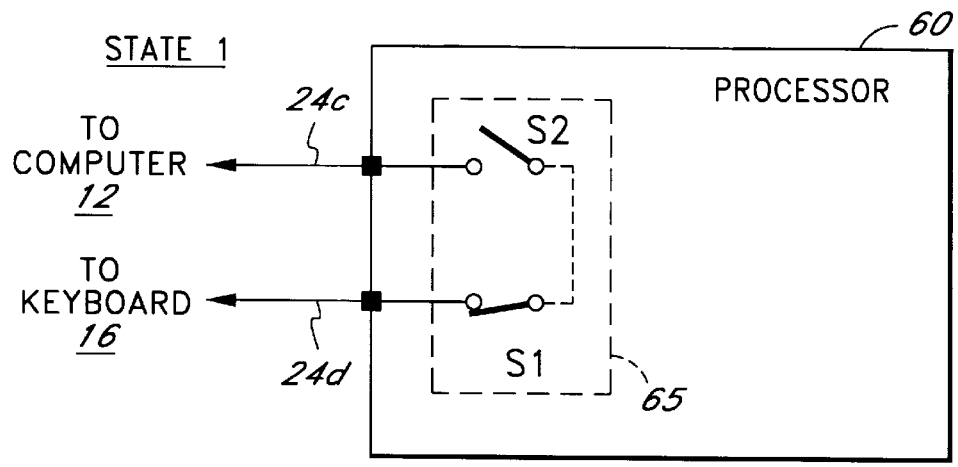
FIG. 3A illustrates one logical state of the processor in the verification unit, representative of one mode of operation in one embodiment of the verification unit.
Figure 3B:
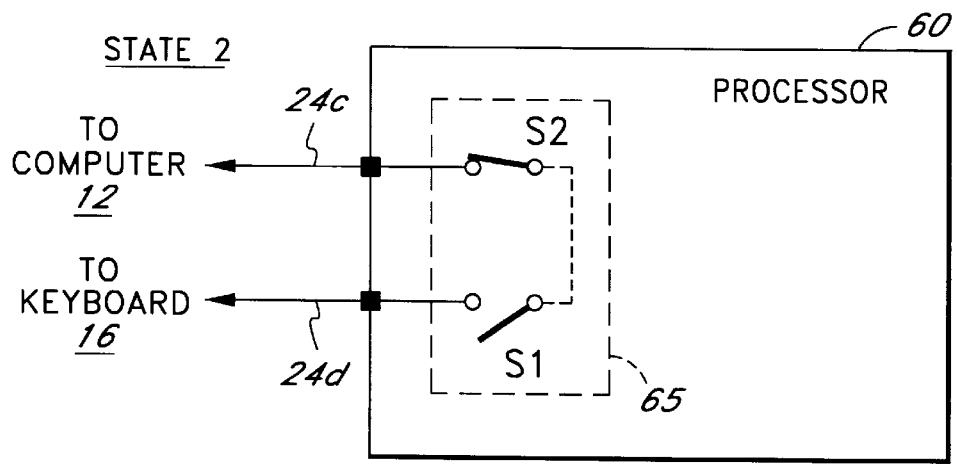
FIG. 3B illustrates a second logical state of the processor in the verification unit, representative of a second mode of operation in one embodiment of the verification unit.
Figure 3C:
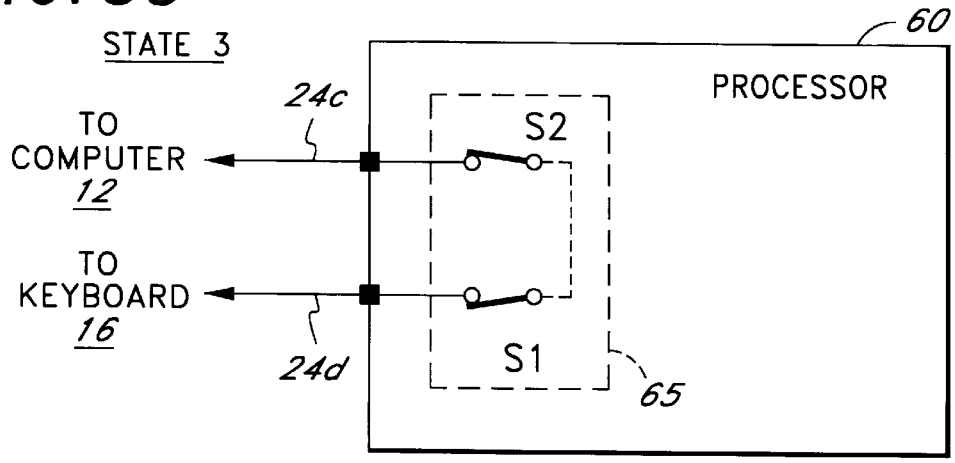
FIG. 3C illustrates a third logical state of the processor in the verification unit, representative of a third mode of operation in one embodiment of the verification unit.

The processor 60 further controls the communications between: (1) the keyboard 16 and the verification unit 20; (2) the keyboard 16 and the computer 12; and (3) the verification unit 20 and the computer 12. This is accomplished by porting data from: (1) the keyboard 16 to the verification unit 20 (or vice-versa); (2) the keyboard 16 to the computer 12 (or vice-versa); or (3) from the verification unit 20 to the computer 12 (or vice-versa), in response to commands issued by the CPU 40 in the computer 12. The porting of data from one unit (i.e., the keyboard 16, verification unit 20 or computer 12) to another unit as discussed above may be described with reference to a "logical switch" 65 as shown in FIGS. 3A–3C.

The logical switch 65 is used to illustrate the three states in which the processor 60 may operate in response to commands issued by the CPU 40. For purposes of discussion, the switch 65 has two switches, S1 and S2. In the first state, S1 is closed while S2 is open, so that there is only communication between the keyboard operator and the verification unit 20. When the processor 60 is in the first state, the LED 38 is turned on, indicating that it is safe for the operator to enter his password via the keyboard 16. In the second state, S1 is open, while S2 is closed. In this second state, there is communication only between the verification unit 20 and the computer 12. In the third state, S1 and S2 are both closed, so that an operator at the keyboard 12 may communicate with the computer 12 in a normal manner.

Thus, under the command of the CPU 40 in the computer 12, the verification unit 20 may intercept the password or Personal Identification Number (PIN) of the operator requesting control of the application software running on computer 12 and verify the password or PIN. This password is entered via the keyboard 16 and provided to the verification unit 20 when the processor 60 is operating in state 1. Upon receipt of the password from the keyboard 16, the verification unit 20 encrypts and temporarily stores the password in RAM 66. It then proceeds to read the encrypted password stored in the card 34 through card reader 68, and compares the encrypted password received from the card 34 with the encrypted password stored in RAM 66.

Upon comparison of the passwords, the verification unit 20 generates a status signal representing the result of the comparison and forwards it to the computer 12. The signal is issued when the processor 60 is operating under state 2. If the status signal indicates that the authentication was successful, i.e., the encrypted password from the keyboard 16 matches the encrypted password from the card 34, the computer 12 grants execution control of the application software to the operator. This is accomplished by issuing a command to the processor 60, which advances to state 3, where communications between the operator at the keyboard 12 and the computer 12 is established. The operator may then access and/or alter the application program(s) unlocked through the use of the password. If the encrypted password from the keyboard 16 did not match the encrypted password from the card 34, access to the computer 12 is denied. The processor 60 thus returns to state 1.

In an alternate embodiment, the password entered via the keyboard 16 is forwarded to the card 34, which compares the password to its internally stored password (state 1). Upon comparison of the passwords, card 34 generates a status signal representing the result of the comparison. The verification unit 20 receives the status signal and forwards it to the computer 12. The signal is issued when the processor 60 is operating under state 2. If the computer 12 grants execution control of the application software to the operator, the processor 60 advances to state 3, where communications between the operator at the keyboard 12 and the computer 12 is established. Otherwise, access to the computer 12 (or its application programs) is denied and the processor 60 returns to state 1.

FIG. 4 is a flow chart of the access authorization process S100 of the present invention. To gain access to a software application enabled with the PAC security application program interface, access authorization from the verification unit must first be obtained. This authorization is obtained as follows. Beginning from a start state, the process S100 proceeds to process step S102, where the PACS running on CPU 40 issues a command to the verification unit 20 for initiating access authorization. The card 34 may be inserted in the verification unit 20 at this time.

The verification unit 20 then proceeds to state 1, as shown in process step S104. In this state, S1 is closed while S2 is open, i.e., data is ported from the keyboard to the verification unit 20 and the communication path between the verification unit 20 and the computer 12 is suspended, which in turn suspends communication between the keyboard 16 and the computer 20. The verification unit 20 then turns on the LED 38, indicating that the path for entering the password is secure. The process S100 then advances to process step S106, where the CPU 40 directs the monitor 14 to display the message "Please enter password". The keyboard operator then enters his or her password via keyboard 16, which is provided to the verification unit 20 via line 22c, the adapter 18, and line 24d. The password is encrypted and temporarily stored in RAM 66.

The process S100 then advances to process step S108, where the verification unit 20 reads the encrypted password stored on the card 34 through the card reader 68. The encrypted password from the card 34 is temporarily stored in RAM 66. The process S100 then proceeds to process step S110, where the processor 60 in the verification unit 20 determines if the entered encrypted password is valid by comparing it to the encrypted password previously stored on the card 34. The result of the validation process is sent to the computer 12, as shown in process step S112. The process S100 advances to decision step S114, where the CPU 40 in computer 12 determines if result provided indicates that the entered password is valid. If the CPU 40 determines that the password is invalid, it issues a command to the processor 60 in the verification unit to remain in state 1, as shown in process step S116. The operator is thus denied access to the software on the computer 12. In addition, the failed attempt is recorded by the card 34.

The process S100 then proceeds to decision step S118, where the verification unit 20 determines if a predetermined number N of consecutive failed attempts have been recorded. If not, the process S100 returns to process step S106, where the operator is allowed another attempt at entering the correct password. If, however, the verification unit 20 determines that the predetermined number N of consecutive failed attempts has been reached, the process S100 proceeds to process step S120, where the card 34 is locked and/or permanently disabled. The process S100 then terminates. This feature of the verification unit 20 ensures that consecutive tries at guessing the password can be detected. In addition, this feature of the verification unit 20 provides additional security by locking and/or permanently disabling the card 34 after a predetermined number of consecutive failed attempts has occurred.

If, at decision step S114, the entered password is determined to be valid, the CPU 40 in computer 12 issues a command to the processor 60 in the verification unit 20 to direct the processor 60 to proceed to state 3, where communications between the keyboard and computer may be established, as shown in process step S122. The process S100 then terminates. Alternatively, the CPU 40 may prompt the keyboard operator to enter a second password, and process steps S106–S122 may be repeated to provide additional security. The application software program or programs accessed by the operator upon authentication of his entered password may be used to perform cryptographic operations, such as the decryption or encryption of messages.

As discussed earlier, in an alternate embodiment, the process S100 may, at process step S108, forward the entered password to the card 34 for comparison. In that case, the password is temporarily stored in memory 36 of the card 34. The processor 35 of the card then compares the entered password with its internally stored password. Upon comparison, the processor 35 issues a status signal to the verification unit 20, that is representative of the result of the search. The verification unit 20 than issues another signal to the computer 12 indicative of this result. The process S100 then proceeds as described above. It is understood by one skilled in the technology that the status signal may be implemented as a status bit or a flag that is forwarded from the card 34 to the verification unit 20 or from the verification unit 20 to the computer 12.

In one embodiment, the verification unit 20 can perform additional security functions for the protection of application programs running on the CPU 40 in computer 12, which is in turn coupled to a computer network or system. These functions include the creation and alteration of users who are authorized to use the application programs. Examples of such functions are illustrated in FIGS. 5A–5B, FIGS. 6A–6D, and discussed in detail in the following sections. The additional security functions also involve the management of cipher keys that protect other keys and the generation of session keys that are sent to the PACS residing the CPU 40 for use in preparing classified documents and files. An example of key management provided by the verification unit 20 includes the translation of encrypted keys, as illustrated in FIG. 7 and as discussed in detail in the following sections.

Figure 5A:
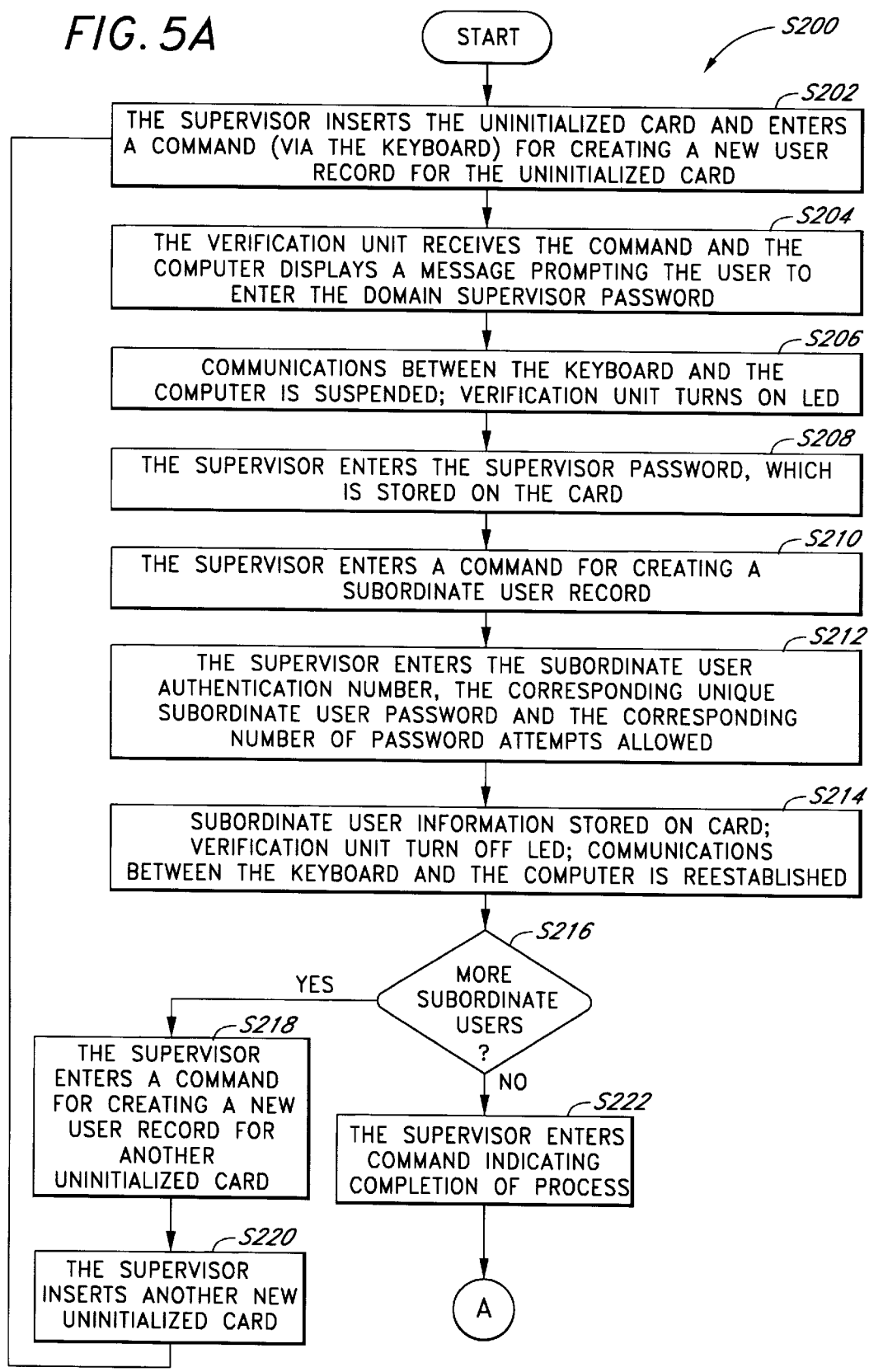
FIGS. 5A and 5B illustrate a flow chart of the process S200 of the present invention for creating a new user record for an uninitialized card.
Figure 5B:
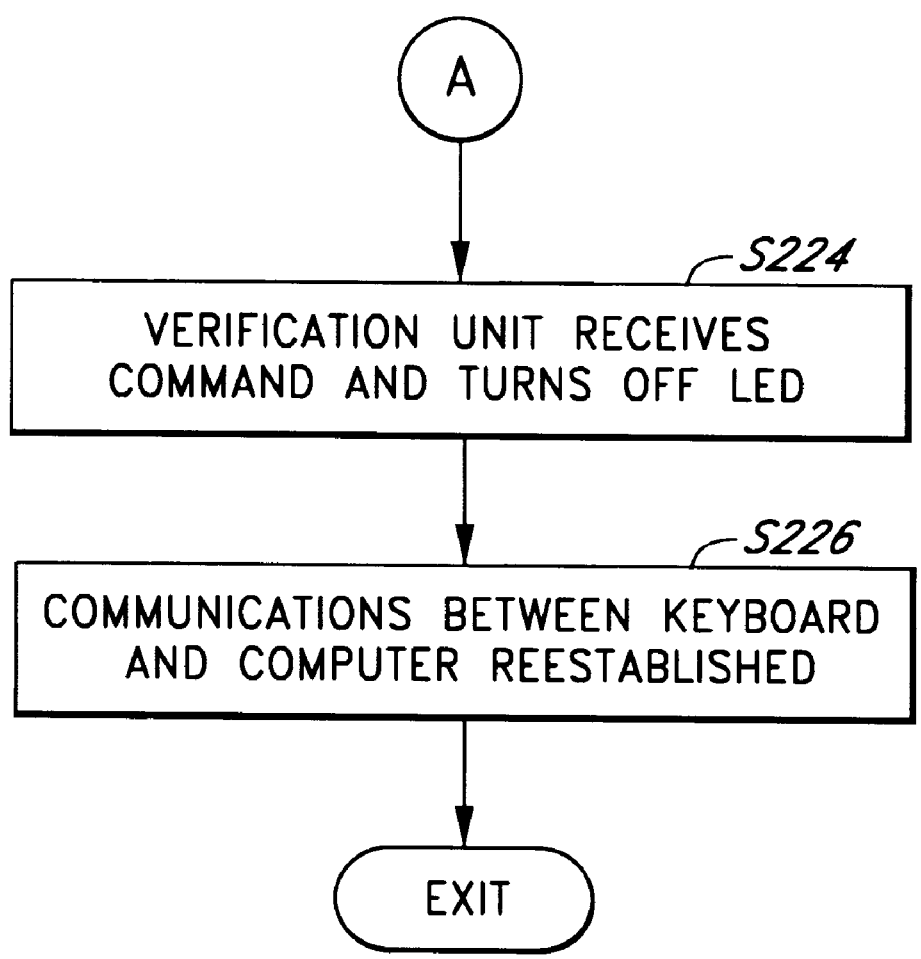

FIGS. 5A–5B illustrate is a flow chart of the process S200 of the present invention for creating a new user record. Upon receiving one or more uninitialized cards, an operator in a managing position, such as a supervisor, may utilize the verification unit 20 for creating new user record and to store the record on each card, such as card 34. The process S200 proceeds as follows. Beginning from a start state, the process S200 advances to process step S202, where the supervisor inserts the uninitialized card into the verification unit 20 and enters a command, via keyboard 16, for creating a new user record for the uninitialized card. The command thus entered may be entered by depressing a particular key on the keyboard 16, which is provided as a scan code to the verification unit 20.

Upon receiving the command, the verification unit 20 interprets the command or scancode to identify the key that the supervisor has entered. It then issues a signal to the computer 12 requesting the computer 12 to display a message prompting the supervisor to enter the supervisor password. The computer 12 responds by displaying this message (step S204). Communications between the keyboard 16 and the computer 12 is then suspended, and the verification unit 20 turns on the LED 38, indicating that the path for entering the password is secure (step S206). The supervisor then enters the supervisor password, which the verification unit 20 stores on the card (step S208).

Next, the supervisor enters a command for creating a subordinate user record (step S210). The supervisor first enters the subordinate user authentication number, followed by the corresponding unique subordinate user password and the corresponding number of password attempts allowed for gaining access to a particular program, or to the card 34 (step S212). When the supervisor has completed entering this information, he enters another command indicating such completion. The verification unit 20 then stores the subordinate user information on the card and then turns off the LED 38. Communications between the keyboard 16 and the computer 12 is then reestablished (step S214).

The process S200 then advances to decision step S216, where it determines if there are more uninitialized cards for which new user records have to be created. If so, the process S200 proceeds to process step S218, where the supervisor enters a command for creating another new user record for another uninitialized card. The process S200 then proceeds to process step S220, where the supervisor inserts another uninitialized card. The process S200 then proceeds back to process step S202 to repeat the steps for creating a new user record.

If, at decision step S216, the process S200 determines that there are no other uninitialized cards for which new user records have to be created, the process S200 proceeds to process step S222, where the supervisor enters a command indicating the completion of the process S200. The process S200 then advances to process step S224, where the verification unit 20 receives the command and turns off the LED 38. Communications between the keyboard 16 and the computer 12 is then reestablished (step S226) and the process S200 terminates.

The process S200 illustrated in FIGS. 5A–5B and discussed above may be performed in an unsecured location, since the new user information is not provided to the computer 12 and cannot be captured or tampered with. However, the verification unit 20 may be configured to receive and write information regarding the new user to the card, such as card 34 without the use of a secure path. In this embodiment, the computer 12 utilized may be isolated and located in a secure room, so that the communications path between the keyboard 16 and the computer 12 need not be suspended during the entry and storage of the new user record.

Figure 6A:
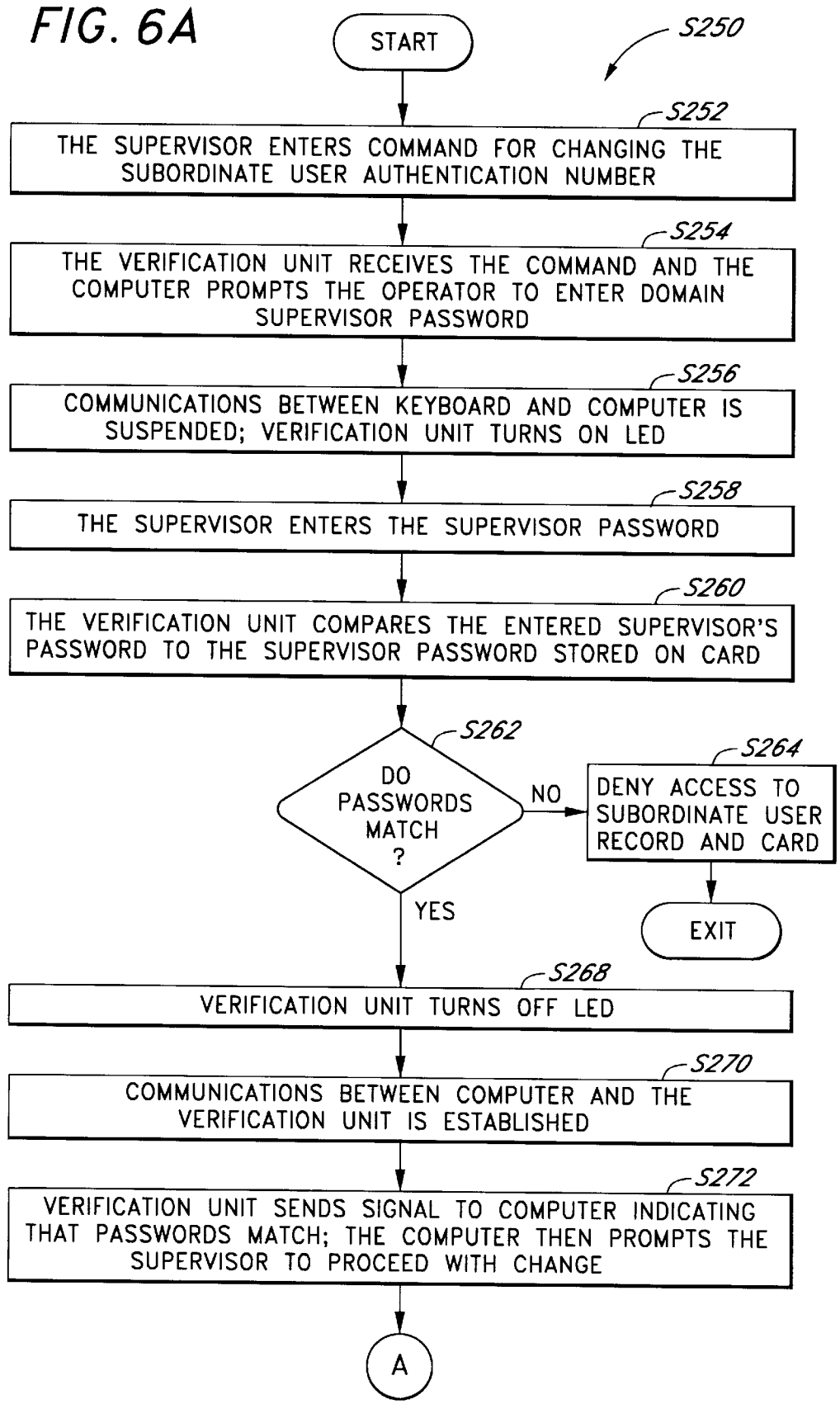
FIGS. 6A and 6B illustrate a flow chart of the user alteration process S250 of the present invention.
Figure 6B:
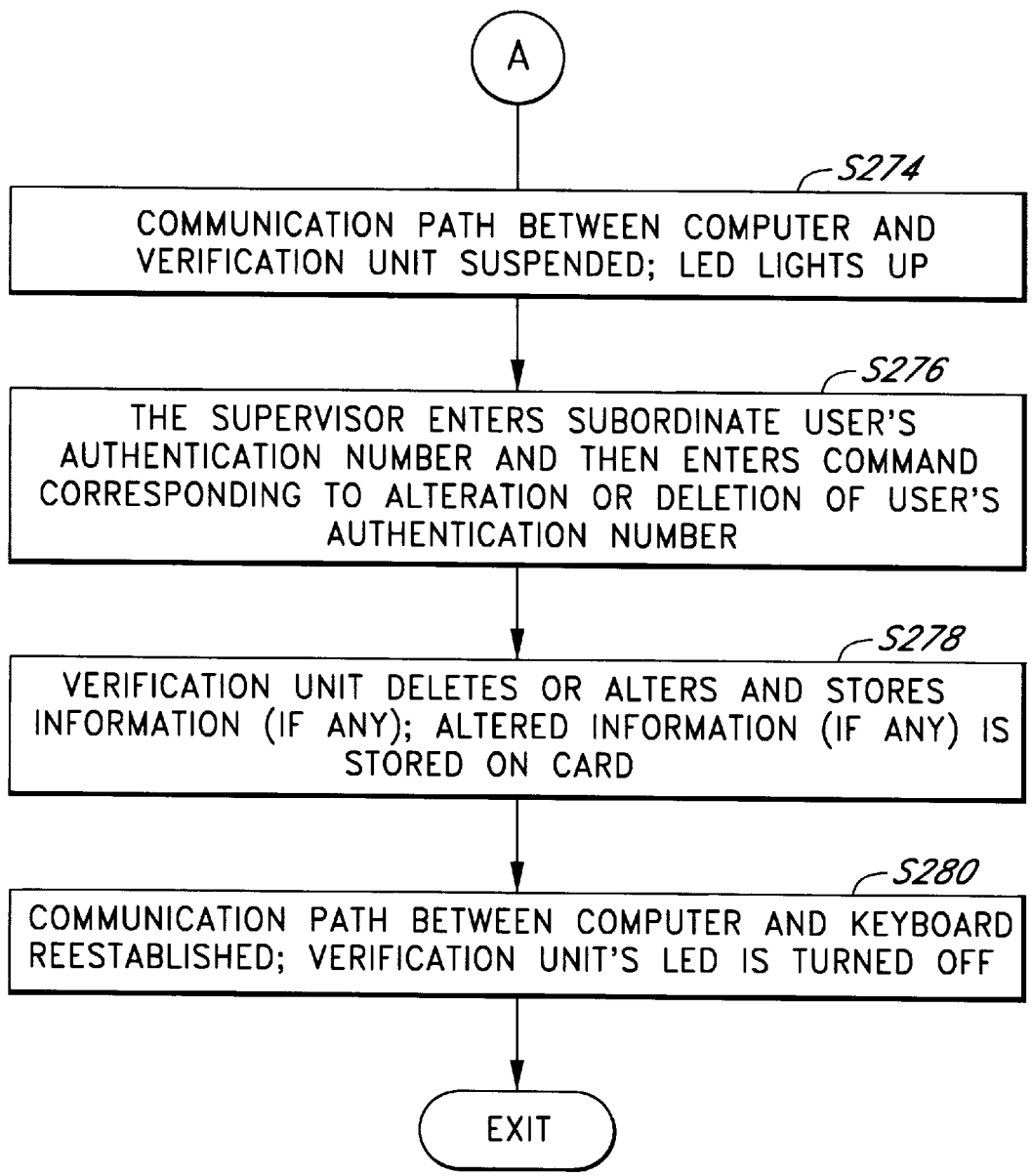

After creating a new user record for a subordinate user, records may have to be updated, deleted or altered. This may be accomplished through the user alteration process S250 as shown in FIGS. 6A–6B. Beginning from a start state, the process S250 proceeds to process step S252, where the supervisor inserts the card with the information to be altered and enters a command for changing the subordinate authentication number. The process S250 then proceeds to process step S254, where the verification unit 20 receives the command and issues a signal to the computer 12, which prompts the supervisor to enter the supervisor password. Communications between the keyboard 16 and the computer 12 is then suspended, and the verification unit 20 turns on the LED 38, indicating that the path for entering the password is secure, as shown in process step S256. The supervisor then enters the supervisor password (step S258).

Upon receiving the supervisor password, the verification unit 20 compares the entered supervisor password with the supervisor password stored on the card 34, as shown in process step S260. The verification unit 20 then determines if the passwords match (decision step S262). If not, access to the subordinate user record and to the card, is denied. The process S250 then terminates.

If, at decision step S262, it is determined that the passwords match, the process S250 proceeds to process step S268, where verification unit 20 turns off the LED 38. Communications between the computer 12 and the verification unit 20 is reestablished, as shown in process step S270. The verification unit 20 then issues a signal to the computer 12 indicating that the passwords match and the computer 12 responds by prompting the supervisor to proceed with the desired change (step S272). The process S250 then advances to process step S274, where the communication path between the computer 12 and the verification unit 20 is suspended. At this juncture, the verification unit 20 turns on the LED 38, indicating that the path between the keyboard 16 and the verification unit 20 is secure.

The process S250 then proceeds to process step S276, where the supervisor enters the subordinate user's authentication number, and a command corresponding to the alteration or deletion of the user's authentication number. The process S250 then proceeds to process step S278, where the verification unit 20 deletes or alters the corresponding information. The altered information, if any, is then stored on the card 34. The process S250 then proceeds to process step S280, where the verification unit 20 turns off the LED 38 and communications between the computer 12 and the keyboard 16 is then reestablished. The process S250 then terminates.

FIGS. 6C–6D illustrate a flow chart of the password alteration process S300 of the present invention. This process S300 may be used by a supervisor or a subordinate user to alter his password. Beginning from a start state, the process S300 proceeds to process step S302, where the supervisor or the subordinate user inserts his or her card and enters a command for changing his or her password. The process S300 proceeds to process step S304, where the verification unit 20 issues a signal to the computer 12 indicating receipt of the command. The computer 12 responds by prompting the supervisor or subordinate user to enter the current password. Communications between the keyboard 16 and the computer 12 is then suspended, and the verification unit 20 turns on the LED 38, as shown in process step S306. The supervisor or subordinate user then enters the current password, as shown in process step S308. The verification unit 20 then compares the entered password with the password stored on the card 34, as shown in process step S310.

Next, the process S300 proceeds to decision step S312, where the verification unit 20 determines if the passwords match. If not, the password alteration process is denied to the operator, as shown in process step S314. The process S300 then terminates. If, at decision step S312, the verification unit 20 determines that the passwords match, the process S300 proceeds to process step S316, where communications between the verification unit and the computer 12 is reestablished, while communications between the verification unit 20 and the keyboard 16 remains inhibited. The process S300 then advances to process step S318, where the verification unit 20 sends a signal indicative of successful authentication of the entered password to the computer 12. The verification unit 20 then turns off the LED 38.

Next, the process S300 proceeds to process step S320, where the computer 12 prompts the operator to enter the new password. Communications between the verification unit 20 and the computer 12 is then suspended, while communications between the keyboard 16 and the verification unit 20 is reestablished, as shown in process step S322. The verification unit 20 then turns on the LED 38. The process S300 then proceeds to process step S324, where the operator enters the new password, which is temporarily stored in the RAM 66 of the verification unit 20. Next, the verification unit 20 turns off the LED 38 and the computer 12 prompts the operator to enter the new password again, as shown in process step S326. Communications between the verification unit 20 and the computer 12 is suspended, and the LED 38 is turned on again, as shown in process step S328. The operator then enters his new password again, as shown in process step S330. Control is then passed to decision step S332.

At decision step S332, the verification unit 20 determines if the two entries match. If not, the process S300 proceeds to process step S334, where the verification unit 20 turns off the LED 38 and communications between the computer 12 and the verification unit 20 is reestablished. The process S300 then returns to process step S320. If, at decision step S332, the verification unit 20 determines that the two entries match, the process S300 proceeds to process step S336, where the verification unit 20 replaces the password read from the card 34 with the new password. The verification unit 20 then turns off the LED 38 and communications between the computer 12 and the verification unit 20 is reestablished, as shown in process step S338. The process S300 then terminates.

FIG. 7 is a flow chart of the key translation process S400 of the present invention. Beginning from a start state, the process S400 proceeds to process step S402, where an operator A located at the computer 12 receives an encrypted message from an operator B at another computer (not shown). The operator A also receives a key K for encrypting the message from B, which was encrypted with B's private key and forwarded with B's user identification (ID). To encrypt the message, operator A forwards B's user identification and the encrypted key K to the verification unit 20 (step S404). The verification unit 20 then compares the encrypted key K with keys that are stored in the ROM 64 of the verification unit 20 (step S406). Each key on the list has a corresponding translation key which may be used in translating the encrypted key K. If the key K does not match any of the keys on the list, the process S400 proceeds to process step S408, where the verification unit 20 sends a signal to computer 12 indicating that there is no match. The computer 12 then displays a message indicating that the key K cannot be translated. The process S400 then terminates. If, at decision step S406, the verification unit 20 determines that the key K matches one of the keys on the list, the process S400 proceeds to process step S410, where the verification unit 20 decrypts the encrypted key K with the translation key associated with the matched key on the list, and re-encrypts the decrypted key using A's private key. The process S400 then proceeds to process step S412, where the re-encrypted key is forwarded back to A, and used to decrypt the message from B. The process S400 then terminates.

Other functions of the verification unit 20 include the management of cipher keys that protect other keys and the generation of session keys that are sent to the PACS residing the CPU 40 for use in preparing classified documents and files. Examples of such functions include the generation of a random number and the enciphering or deciphering of data, which are discussed in detail in the following sections.

Upon request by the operator or by an application program running on the computer 12, the verification unit 20 may generate a random number, which is provided to the computer 12. The random number may be used to encrypt messages or other keys. Since the program which generates random numbers on the computer 12 may easily be captured or emulated, this aspect of the present invention permits provides a secure means of providing session keys. The random number thus generated may also be stored on the card 34 and subsequently used to encrypt other keys.

The verification unit 20 may also encipher data provided from the computer 12, upon request from the operator or by an application program running on the computer 12. For example, a command representative of such a request is first entered by the keyboard operator. The data to be enciphered is forwarded from the computer 12 to the verification unit 20. Upon receipt of this data, the verification unit 20 enciphers it using one of a plurality of keys stored in its memory 62. The enciphered data is then returned to the computer 12.

Likewise, the verification unit 20 may decipher data provided from the computer 12, upon request from the operator. In this case, the operator must first be authenticated, using process S100 as described above. When authenticated, the operator issues a command to the verification unit, requesting the deciphering of a block of data. The data to be deciphered, along with a key identification number which identifies the key to be used for deciphering (located in the verification unit 20), are then provided to the verification unit 20. Upon receipt of this information, the verification unit 20 deciphers the data and then sends the deciphered data back to the computer 12.

The implementation of the present invention provides a simple, cost-effective and compact system that enforces access control to one or more application programs running on a computer, while requiring minimal user relocation. The implementation of the present invention authenticates passwords for accessing such application programs while ensuring that the passwords will not be tampered with by software running on the computer. The present invention also facilitates the creation and alteration of users who are authorized to use the application programs. In addition, the present invention provides a number of security functions for the protection of application programs running on the computer. These functions involve the management of cipher keys that protect other keys and the generation of session keys that are sent to the computer for use in preparing classified documents and files.

Thus, the present invention provides a simple, elegant and cost-effective consumer-level method and apparatus of authenticating a password or personal identification number (PIN) independently from the computer, so that access control to one or more application programs running on the computer may be enforced, while minimizing the risk of capture of the password by unauthorized users and also minimizing the complexity of user operation. Due to the cost-effective and compact features of the present invention, the verification unit 20 may readily be utilized in consumer-level applications such as home-banking.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A security verification apparatus for controlling access to at least one program on a computer by verifying data entered through a keyboard with data located on a card, comprising:

a verification device, external to and operable independently of the computer, having a port that provides a direct communication path to the keyboard and the computer, said verification device controlling communication between the keyboard and the computer via said port, said verification device communicating with the keyboard and the computer via said port, said verification device provides the data entered through the keyboard to the card, which compares the data from the keyboard with the data from the card, said verification device being operable in a first mode wherein access to the computer via the keyboard is inhibited, said verification device being operable in a second mode, wherein the keyboard is coupled to the computer so that the at least one program on the computer is accessible via said keyboard when the data entered through the keyboard matches the data from the card;

said verification device providing a first data path between the keyboard and the computer, a second data path between the keyboard and the verification device, and a third data path between the computer and the verification device.

2. The apparatus of claim 1, wherein the verification device operates in the first mode when receiving the data from the keyboard and when the card is comparing the data from the keyboard with the data from the card.

3. The apparatus of claim 1, wherein the verification device operates in the first mode in response to a first command from the computer.

4. The apparatus of claim 1, wherein the verification device operates in the second mode in response to a second command from the computer.

5. The apparatus of claim 1, wherein said verification device operates in a third mode in which said verification device is coupled to the computer and wherein access to the verification device from the keyboard is inhibited.

6. The apparatus of claim 4, wherein the verification device operates in the third mode in response to a third command from the computer.

7. The apparatus of claim 1, wherein the verification device comprises a light emitting diode which indicates the operation of said verification device in the first mode.

8. The apparatus of claim 1, wherein the verification device comprises:

a processor; and a card reader/writer for reading data from and writing data to the card.

9. A method for assembling a system that controls access to at least one program running on a computer, comprising:

(a) providing a verification device external to and operable independently of the computer;

(b) connecting a keyboard to the computer to provide a first data path between the keyboard and the computer;

(c) providing a second data path between the keyboard and the verification device; and (d) connecting the computer to the verification device to provide a third data path between the computer and the verification device.

10. The method of claim 9, further comprising:

(e) receiving data from the keyboard;

(f) reading data from a card;

(g) comparing the data from the keyboard to the data from the card;

(h) granting access to the at least one program on the computer if the data from the keyboard matches the data from the card; and (i) otherwise denying access to the at least one program on the computer.

11. The method of claim 10, wherein in (d), the computer is de-coupled from the keyboard.

12. The method of claim 10, wherein (i) comprises:

(i.1) denying access to the at least one program on the computer if the data from the keyboard does not match the data from the card;

(i.2) recording the number of invalid attempts at obtaining access to the program on the computer; and (i.3) disabling the card after the invalid attempts exceed a predetermined number.

13. The method of claim 9, wherein (d) comprises:

(d.1) providing a signal by said verification device to indicate that said verification device is ready to receive data from the keyboard; and (d.2) receiving the data from the keyboard.

14. The method of claim 10, wherein comprises:

granting access to the at least one program on the computer if the data from the keyboard matches the data from the card by coupling the computer to the keyboard.

15. The method of claim 10, wherein (i) comprises:

denying access to the at least one program on the computer if the data from the keyboard does not match the data from the card by ensuring that the keyboard is de-coupled from the computer.

16. A system for verifying access authorization to at least one program on a computer, comprising:

a keyboard through which data is entered;

a card that contains verification data; and a verification device, external to and operable independently of the computer, that receives said card, said verification device providing a first data path between the keyboard and said computer, a second data path between the keyboard and the verification device and a third data path between the computer and the verification device;

said verification device provides the data entered from the keyboard to the card, said card compares the data from the keyboard with the data from the card, said verification device being operable in a first mode wherein access to at least one program on the computer via the keyboard is inhibited, said verification device being operable in a second mode, wherein the keyboard is coupled to the computer so that the computer is accessible via said keyboard when the data from the keyboard matches the data from the card.

17. The system of claim 16, wherein the verification device operates in the first mode when receiving the data from the keyboard.

18. The system of claim 16, wherein the verification device operates in the first mode in response to a first command from the computer.

19. The system of claim 16, wherein the verification device operates in the second mode in response to a second command from the computer.

20. The system of claim 16, wherein said verification device operates in a third mode in which said verification device is coupled to the computer and wherein access to the verification device from the keyboard is inhibited.

21. A method for controlling access to at least one program running on a computer, comprising:

(a) providing a verification device external to and operable independently of the computer;

(b) providing a first data path between a keyboard and the computer, a second data path between the keyboard and the verification device, a third data path between the computer and the verification device;

(c) receiving, by the verification device, a card having stored data;

(d) entering data through the keyboard;

(e) comparing the entered data with data stored on the card; and (f) granting access to the at least one program on the computer via the keyboard if the entered data matches the data stored on the card; otherwise, denying access to the at least one program on the computer via the keyboard.

* * * * *